(12) United States Patent
Lagmanson

(10) Patent No.: US 6,674,286 B2
(45) Date of Patent: Jan. 6, 2004

(54) METHODS AND APPARATUS FOR MEASURING ELECTRICAL PROPERTIES OF A GROUND USING A GRAPHITE ELECTRODE

(75) Inventor: Mats Lagmanson, Austin, TX (US)

(73) Assignee: Advanced Geosciences, Inc., Austin, TX (US)

( * ) Notice: Subject to any disclaimer, the term of this patent is extended or adjusted under 35 U.S.C. 154(b) by 0 days.

(21) Appl. No.: 09/838,576

(22) Filed: Apr. 18, 2001

(65) Prior Publication Data
US 2003/0090270 A1 May 15, 2003

(51) Int. Cl.[7] ................................................. G01V 3/06
(52) U.S. Cl. ........................ 324/362; 324/71.1; 205/724
(58) Field of Search ................................. 324/362, 71.1, 324/363, 337, 366, 371, 376; 204/196.21, 197, 291, 294, 403.15, 403.13; 205/724

(56) References Cited

U.S. PATENT DOCUMENTS

| | | | | |
|---|---|---|---|---|
| 3,964,924 A | * | 6/1976 | Kurzeja | 106/286 |
| 4,446,434 A | * | 5/1984 | Sternberg et al. | 324/363 |
| 4,786,388 A | * | 11/1988 | Tatum, Jr. | 204/197 |
| 5,948,218 A | * | 9/1999 | Kheder et al. | 204/196 |

OTHER PUBLICATIONS

J. J. Meany Jr. Cathodic Protection of Tannks Bottoms, Oil and Gas Journal, Issue of Oct. 24, 1955 pp. 1–4.*
"Bostomatic Applications," Article found at Bostomatic—Electrode Applications website, http://www.bostomatic.com/abelec.htm, Apr. 1, 2001.
"Custom Electrodes," Intech EDM, 2000.
"EDM Graphite—Cross reference guide to comparing brands & grades of EDM graphite," Intech EDM, 1997.
"Graphite blanks pre–mounted on EROWA ITS compact holders," Intech EDM, 2000.
"Graphite Electrodes," Intech EDM, Section 2: 2.1–2.28, 2000.
Intech EDM On–line Website, http://www.intech–edm.com. Printed Apr. 9, 2001 and Apr. 10, 2001.
*Sparks*, Intech EDM, Spring 1996, 1–4.
*Sparks*, Intech EDM, Summer 1998, 1–4.
*Sparks*, Intech EDM, Winter 1992/1993, 1–4.

* cited by examiner

*Primary Examiner*—N. Le
*Assistant Examiner*—Subhash Zaveri
(74) *Attorney, Agent, or Firm*—Fulbright & Jaworski, LLP

(57) ABSTRACT

Methods and apparatuses for measuring an electrical property of the ground. The apparatus includes a graphite electrode. The graphite electrode includes a graphite body and a first and second opening. The first opening extends longitudinally throughout the graphite body and is configured to receive a multi-wire cable. The second opening is configured to secure one or more wires of the multi-wire cable to the graphite body. Using a graphite electrode, measurements of the ground can be made over a long period of time without having to clean or otherwise maintain the electrodes because the graphite material withstands operating conditions over many years without degradation.

20 Claims, 3 Drawing Sheets

METHODS AND APPARATUS FOR MEASURING ELECTRICAL PROPERTIES OF A GROUND USING A GRAPHITE ELECTRODE

BACKGROUND OF THE INVENTION

Co-pending U.S. patent application Ser. No. 09/422,895 entitled "Methods and Apparatus for Measuring Electrical Properties of a Ground" by Mats Lagmanson is hereby incorporated by reference in its entirety.

1. Field of the Invention

The present invention relates generally to the field of geophysical electrical measurements. More particularly, it concerns methods and apparatus for measuring an electrical property of the ground by utilizing a graphite electrode for transmitting a current into the ground and for measuring a potential associated with that current.

2. Description of Related Art

Various geophysical applications utilize electrical surveys to determine a sub-ground resistivity distribution by making electrical measurements on the ground. From such measurements, the resisitivity of the sub-ground may be estimated and related to various geological parameters such as mineral and fluid content, porosity, and water saturation.

Resistivity measurements are typically made by applying current directly into the ground using a pair of transmitting electrodes. Resulting potential differences may then be measured directly using several other receiving electrodes. The receiving electrodes are typically arranged in an array or grid.

Induced polarization relies upon the fact that current injected into the ground causes some materials to become polarized. The phenomenon of polarizing the ground is often referred to as chargeability. The type and amount of chargeability associated with the ground may be measured by taking time domain and/or frequency domain measurements. In general, such measurements determine the degree to which the ground has been polarized by comparing a source signal transmitted to the ground with a measured decay signal after the source signal has been shut off. One or more physical properties of the ground may be correlated with the degree of polarization.

Both induced polarization and resistivity measurements depend upon electrodes for transmitting and receiving electrical information. Conventional electrodes are made from metal. Although these electrodes have proven their usefulness over the years, problems nevertheless remain. One main problem with metal electrodes is that they cannot withstand long-term, maintenance-free use.

In certain applications, it is desirable to position electrodes underground or underwater for an extended period of time so that the ground can be monitored on a routine basis. For instance, if one is monitoring the conditions of a waste site, it may be useful to position electrodes underground and make measurements once a month for several years to determine, for instance, trends in the recorded data. Metal electrodes, however, are not amenable to this type of measurement.

Metal electrodes demonstrate degradation after several uses. In particular, after being subjected to operating conditions while underground or underwater, metal electrodes exhibit corrosion and electrochemical degradation that impairs their effectiveness. To combat these problems, users typically retrieve the electrodes from the ground (or from underwater) so that they may be replaced or cleaned and maintained. The electrochemical degradation may make it necessary to totally replace the electrode after only a short period of use. During the cleaning, the corrosion is removed from the electrode so that it may once again operate properly. The requirement for repeated replacement or cleaning makes metal electrodes difficult and expensive, especially in applications where long-term measurements are desired.

Therefore, it would be advantageous to provide for the ability to measure an electrical property of the ground using an electrode that can withstand, on a long-term basis, operating conditions underground or underwater. In particular, it would be advantageous to have an electrode that could be buried underground or underwater without having to worry about retrieving it for cleaning or replacement. Such an electrode could be used to study long-term trends without undue maintenance.

SUMMARY OF THE INVENTION

As used herein, the indefinite articles "a" and "an" are to connote "one or more" unless otherwise noted. As used herein, by "ground," it is meant any surface or sub-surface for which an electrical property may be measured. "Ground" may refer to, but is not limited to, the surface of the earth, surface of lakes, rivers, oceans, bottoms of lakes, rivers, oceans, holes, and/or any man-made structures. As used herein, by "electrical potential," it is meant any potential. For example, "electrical potential" applies to, but is not limited to, potentials associated with, for instance, resistivity and/or induced polarization.

In one respect, the invention is an electrode for measuring a property of a ground. The electrode includes a graphite body, a first opening, and a second opening. The first opening extends longitudinally throughout the graphite body for receiving a multi-wire cable. The second opening, within the graphite body, affixes one or more wires of the multi-wire cable to the graphite body.

In other respects, the graphite body may include graphite having a particle size of about 5 microns. The graphite body may include graphite having a shore hardness of about 75. The graphite body may include graphite having an apparent density of about 1.91 grams per cubic centimeter. The graphite body may include graphite having a flexural strength of about 14295 pounds per square inch. The graphite body may include graphite having a resistivity of about 0.000591 ohm-inches. The second opening of the electrode may include a threaded opening for receiving a screw that affixes one or more wires to the graphite body. The electrode may include a waterproof cover upon at least a portion of its graphite body. The waterproof cover may include polyurethane that covers opposite ends of the graphite body.

In another respect, the invention is a method for measuring an electrical property of a ground. A graphite electrode is positioned adjacent the ground. A multi-wire cable is passed through a first opening extending longitudinally throughout the graphite electrode. One or more wires of the multi-wire cable are affixed to the graphite electrode using a second opening within the graphite electrode. A current is delivered to the ground using the graphite electrode, and an electrical potential associated with the current is measured.

In other respects, the electrical property being measured may include resistivity. The electrical property being measured may include induced polarization. The method may also include rendering a map of the ground using the measurement of electrical potential. The graphite electrode may include graphite having a particle size of about 5 microns. The second opening of the electrode may include a threaded opening, and the method may include securing the one or more wires to the graphite electrode with a screw. The positioning of the electrode in the method may include placing the graphite electrode underground or underwater.

In another respect, the invention is a method for long-term, maintenance-free measurement of an electrical property of a ground. A graphite electrode is positioned underground or underwater for more than three months without removing the electrode for replacement or cleaning. A multi-wire cable is passed through a first opening extending longitudinally throughout the graphite electrode. One or more wires of the multi-wire cable are affixed to the graphite electrode with a screw coupled to the graphite electrode. A current is delivered to the ground using the graphite electrode after three months of being underground or underwater without having been replaced or cleaned, and an electrical potential associated with the current is measured.

Generally speaking, the present disclosure describes how electrical resistivity and induced polarization measurements may be performed in order to investigate the underground. At least four graphite electrodes may be implanted in the ground. One pair transmits a signal into the earth and the other electrodes receive the signal. With proper processing known in the art, the induced polarization and resistivity of the earth can be calculated.

Conventional electrodes deteriorate with time depending on corrosion and depending on electrochemical processes when the electric current is passed through the electrodes. For monitoring purposes, it is important to have a functioning monitoring system in the ground for more than 30 years, and perhaps as long as 100 years. The inventor has found that, when using electrodes made of graphite, there is no deterioration caused by corrosion or electro-chemical effect. Thus, such electrodes can be used for a long period of time—perhaps as long as 100 years—with little or no maintenance.

This disclosure deals with using electrodes made of graphite to eliminate the damaging effects of corrosion and electrochemical degradation on electrodes. It also deals with implanting graphite electrodes in the ground for resistivity or induced polarization monitoring. It also deals with graphite electrodes being placed in a lake, river or the sea to perform resistivity or induced polarization monitoring. In this regard, the graphite electrodes may be towed in a lake, river or the sea to perform a continuous resistivity or induced polarization survey.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DESCRIPTION OF ILLUSTRATIVE EMBODIMENTS

The presently disclosed methods and apparatuses allow for the long-term, maintenance-free use of an underground or underwater electrode for measuring electrical properties of the ground. Because the graphite electrodes of the present disclosure do not degrade like typical metal electrodes used today, they may be placed underground or underwater for extended periods of time. Electrical measurements may then be made over long periods of time without having to retrieve the electrodes for cleaning. Thus, the electrodes of this disclosure are well-suited in applications where one wishes to inexpensively monitor ground conditions for an extended period of time. For instance, the electrodes of this disclosure may be particularly well-suited for the monitoring of waste sites, monitoring of the remediation process at clean-up sites, monitoring of conductive injected fluids into the ground, monitoring of moisture movement in the ground, trawling behind a boat while measuring resistivity and induced polarization in a river, lake or sea in order to determine sub-bottom layers, and locate cavities and fractures under buildings, foundations, and other structures.

Additionally, the electrodes of this application do not harm the environment and may therefore be left underground indefinitely, if so desired. Thus, unlike systems using metal electrodes, systems according to the present disclosure may be buried underground, used over a long period of time without electrode cleaning, and left underground once a project is completed.

Figure 1:
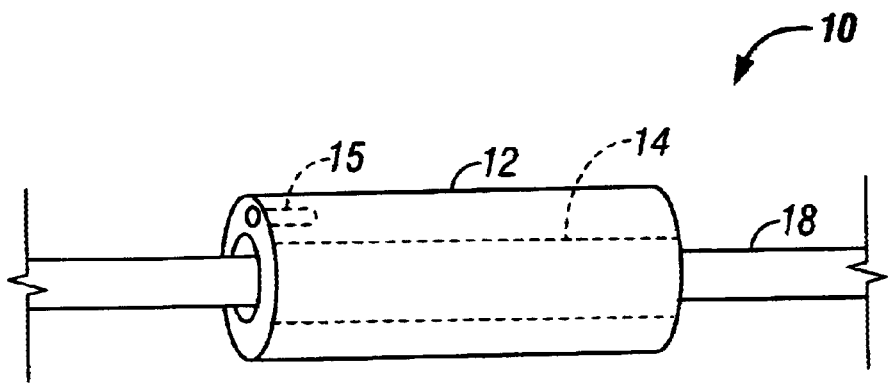
FIG. 1 is a schematic diagram showing a graphite electrode according to one embodiment of the present disclosure.

FIG. 1 shows a graphite electrode 10 according to one embodiment of the present disclosure. It includes a graphite body 12, a first opening 14, and a second opening 15. First opening 14 is configured to receive a multi-wire cable such as cable 18 of FIG. 1. Second opening 15 may be used to affix one or more of the wires of cable 18 to the electrode body 12, as is better shown in FIG. 2.

Figure 2:
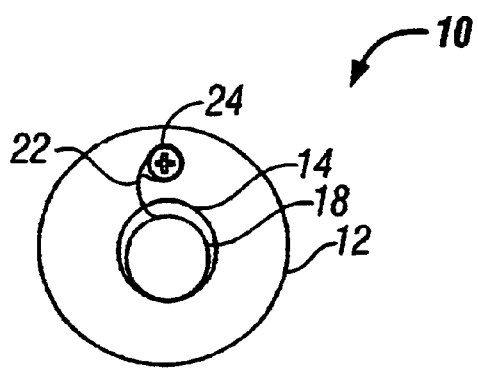
FIG. 2 is a front view of the electrode of FIG. 1.

FIG. 2 shows the graphite electrode 10 as a front view. In FIG. 2, wire 22 from cable 18 has been attached to electrode body 12 using screw 24, which is inserted into second opening 15 (second opening 15 being shown in FIG. 1). In this embodiment, second opening 15 may be a threaded opening so that screw 24 may be easily inserted and removed from electrode body 12. By tightening screw 24 tightly against electrode body 12, wire 22 may form a good electrical contact with the electrode.

Wire 22 may be removed from cable 18 in order to make the connection shown in FIG. 2 by first forming a small slit in the covering of cable 18. Wire 22 may then be cut from within cable 18 and maneuvered outside of cable 18 and through opening 14 so that it can be attached to second opening 15 (by way of, for example, screw 24). As will be understood by those having skill in the art, different electrodes within a system may each be connected to a different one of the wires within cable 18. For instance, the electrode of FIG. 2 may be connected to wire 22 while a different electrode may be connected to a different wire, etc.

The electrode shown in FIGS. 1 and 2 is a graphite electrode. The inventor has discovered that graphite electrodes withstand operating conditions (i.e., being subjected to electrical fields common in geophysical applications) underground and underwater and can be used over a long period of time without incurring detrimental corrosion, electrochemical degradation, or other problems that necessitate replacement, maintenance, or cleaning.

Pure graphite consists of carbon atoms arranged in hexagonal rings in offset layers and has a density of about 2.1 grams per cubic centimeter. Graphite may be manufactured as is known in the art. A carbon powder with binders may be used as a starting material for the manufacturing process, which includes a pressing process followed by sintering and a high-temperature annealing process. Manufactured carbon may be porous with an apparent density between about 1.5 and about 1.95 grams per cubic centimeter.

The starting materials for the graphite electrodes of the present invention may be purchased commercially. For instance, Intech EDM, (2001 Parkes Drive, Broadview, Ill. 60155–3952; Tel: (708) 681–6110) supplies graphite in configurations according to the customer. The inventor has found that Intech EDM's MG-7 grade of graphite works well in the practice of this invention. According to Intech EDM's technical information, the MG-7 grade of graphite has the characteristics of Table 1:

TABLE 1

| Grade | Identifying color | Shore hardness | Apparent density (g/cm$^3$) | Flexual strength (psi) | Resistivity (10$^{-6}$ ohm-inch) | Particle size (microns) |
|---|---|---|---|---|---|---|
| MG7 | Grey | 75 | 1.91 | 14295 | 591 | 5 |

Having the benefit of this disclosure, those having skill in the art will, however, recognize that other grades of graphite may also be used in the practice of this invention. For instance, one may use one or more of other grades of graphite from commercial vendors. Using Intech EDM as an exemplary vendor, one or more of the different grades of Table 2 may be used:

TABLE 2

| Grade | Identifying color | Shore hardness | Apparent density (g/cm$^3$) | Flexual strength (psi) | Resistivity (10$^{-6}$ ohm-inch) | Particle size (microns) |
|---|---|---|---|---|---|---|
| MG3 | Yellow/Green | 55 | 1.78 | 6000 | 430 | 10 |
| MG4 | Pink | 60 | 1.85 | 7100 | 500 | 10 |
| MG5 | Brown | 63 | 1.78 | 7540 | 525 | 8 |
| MG6 | Brown/Pink | 70 | 1.85 | 10667 | 551 | 10 |
| MG5C | Violet | 55 | 2.90 | 15171 | 100 | 15 |
| MG7C | Gold | 75 | 2.93 | 15150 | 680 | 5 |

The openings of FIGS. 1 and 2 (openings 14 and 15) may be made by methods known in the art. Additionally, commercial vendors offer services in machining graphite parts according to the design of customers. For instance, Intech EDM, mentioned above, can be used machine graphite parts such as those shown in FIGS. 1 and 2.

The size and shape of electrode 10 FIGS. 1 and 2 (and the relative size of its features) may vary widely according to application. In one embodiment, electrode 10 may be cylindrical, as illustrated, and may be about four inches long with a diameter of about 1.25 inches. First opening 14 may have a diameter of about 0.7 inches to accommodate cable 18, which typically has a diameter of about 0.5 inches. Second opening 15 may extend about 1 inch within electrode body 12 and may be threaded to accept a 4–40 brass type of screw. Those having skill in the art will recognize that a myriad of other shapes and sizes may be used in the practice of this invention. The dimensions set forth above (and type of screw) are not required; rather, they simply set forth one particular, suitable embodiment.

Figure 3:
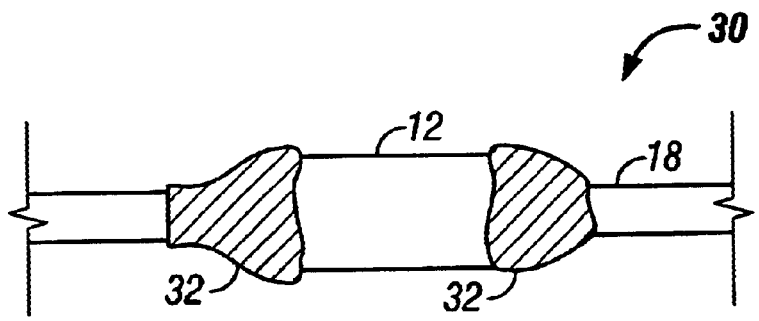
FIG. 3 is a schematic diagram showing a covered graphite electrode according to one embodiment of the present disclosure.

FIG. 3 illustrates a graphite electrode 30 equipped with a waterproof cover 32. The cover 32 of FIG. 3 covers opposite ends of graphite body 12. However, in other embodiments, it may cover the entirety or different portions of graphite body 12. Covers 32 may be utilized to prevent water from affecting the electrical measurements. Many different materials may be used for cover 32, including, but not limited to vinyl, polyurethane, or epoxy.

Figure 4:
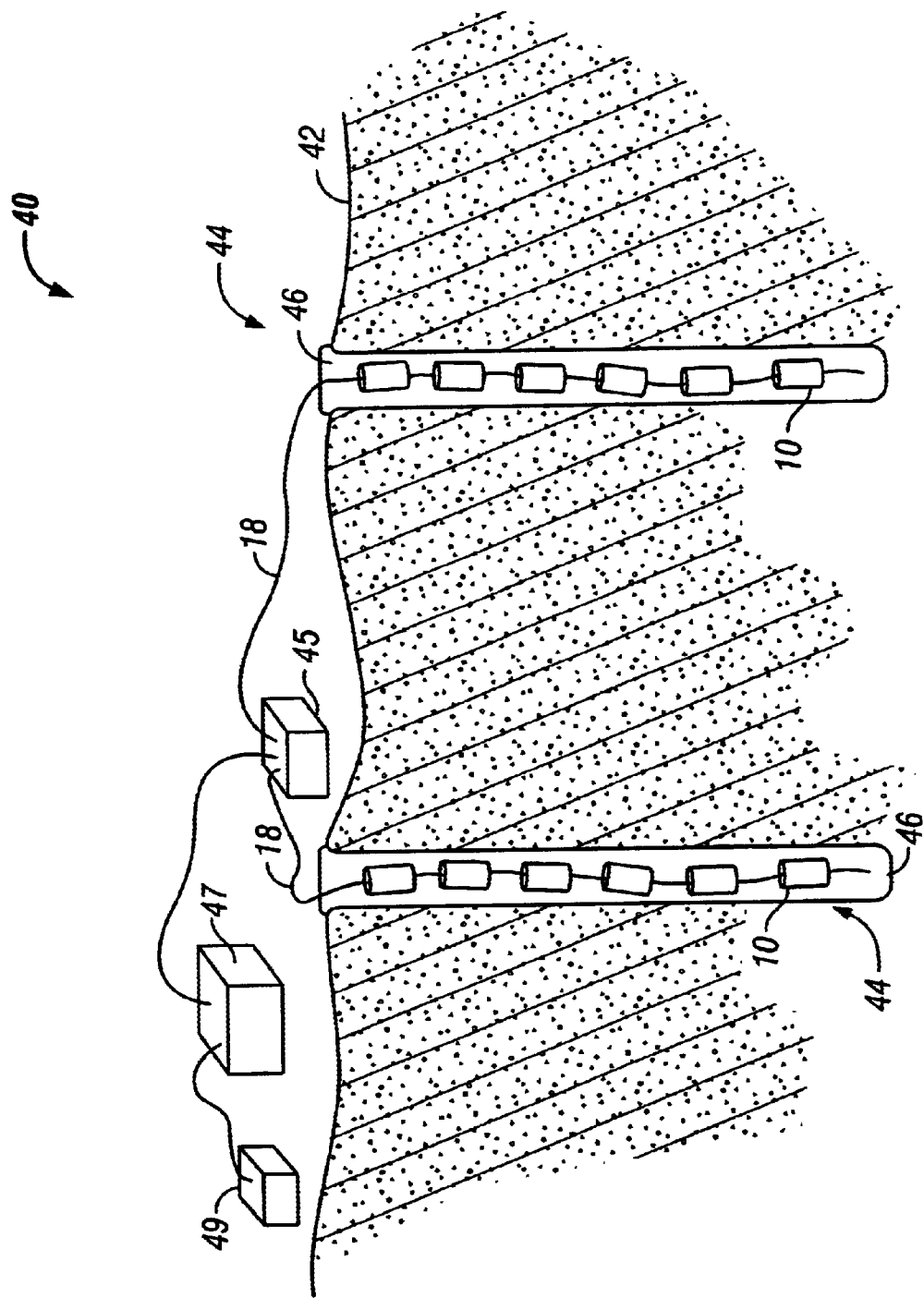
FIG. 4 is a schematic diagram showing graphite electrodes of the present disclosure buried underground for measuring electrical properties of the ground.

FIG. 4 shows an underground system 40 using electrodes such as those in FIGS. 1–3. Illustrated in FIG. 4 are ground 42, holes 44, bentonite 46, switching box 45, instrument box 47, battery 49, electrodes 10, and cable 18.

Holes 44 may be formed by methods known in the art. For instance, they may be formed by drilling. Holes 44 may be partially or completely filled with a material such as bentonite 46, which acts to accommodate a good electrical coupling to the earth and a stable installment of the electrodes.

The general setup and electrical instrumentation of the system shown in FIG. 4 is known in the art, and hence will not be described in detail. In general, battery 49 provides the power for instrument box 47, which provides electrical current for measurements. Switching box 45 switches appropriate electrodes on and off to record data. In particular, switching box 45 is used to deliver a current to electrodes, while other electrodes are used to measure the resulting electric potential.

As is known in the art, information from the electric potentials may be used to analyze a wide variety of phenomena, and one or more suitable maps may be formed from that data.

One of the significant advantages offered by the present disclosure is that the graphite electrodes 10 of FIG. 4 do not require maintenance, in contrast to conventional electrodes in use today. Specifically, the electrodes 10 of FIG. 4 may be left underground without cleaning or replacement for periods in excess of at least three months and the inventor believes that much longer time periods are possible, perhaps on the order of tens of years. During that entire time, reliable measurements may be made. In contrast, after just several uses, conventional metal electrodes show signs of electrochemical degradation and corrosion, which if left unattended, will impair the operation of the system. Thus, with conventional electrodes, scheduled electrode replacements or cleanings must be undertaken at frequent intervals. These replacements and cleanings are time consuming, and correspondingly, expensive. At some sites, such as radioactive waste sites or other contaminate polluted sites, retrieval of electrodes is not permitted. In those situations, it is essential to have an electrode system that will last as long as possible after installation.

Additionally, using the electrodes of 10 of FIG. 4, the entire installation shown in FIG. 4 may be left underground, even after all measurements are completed because the graphite electrodes 10 do not cause any environmental harm to the underground. Thus, after a long period of maintenance-free measurements, the system may be sealed off and left underground. This minimizes any clean-up costs and any further spreading of contamination, providing for yet another advantage.

Figure 5:
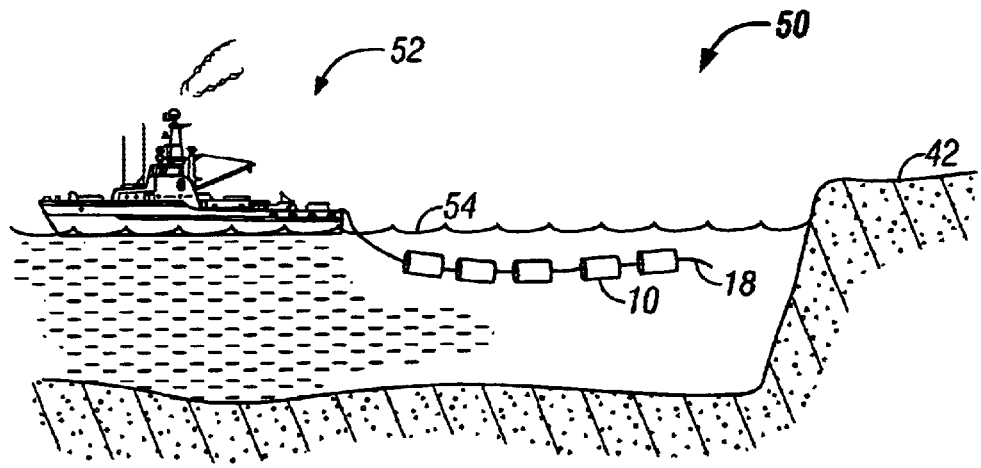
FIG. 5 is a schematic diagram showing graphite electrodes of the present disclosure being pulled by a boat for measuring electrical properties of ground that is underwater.

FIG. 5 shows a system 50 similar to system 40 of FIG. 4 except that system 50 is partially underwater. In this system, a boat 52 pulls a chain of electrodes 10 connected to multi-wire cable 18 partially under water 54. Instrumentation such as battery 49, instrument box 47, and switching box 45 of FIG. 4 (not shown in FIG. 5) may be housed on boat 52.

The electrical measurements in FIG. 5 may be made as is known in the art to probe characteristics of ground 42. However, unlike conventional systems, the graphite electrodes 10 of FIG. 5 are not subjected to accelerated corrosion due to the harsh underwater conditions. Therefore, the electrodes 10 shown in FIG. 5 may make measurements without cleaning cycles for months or even tens of years. Again, foregoing the cleaning saves time and thus money.

Figure 6:
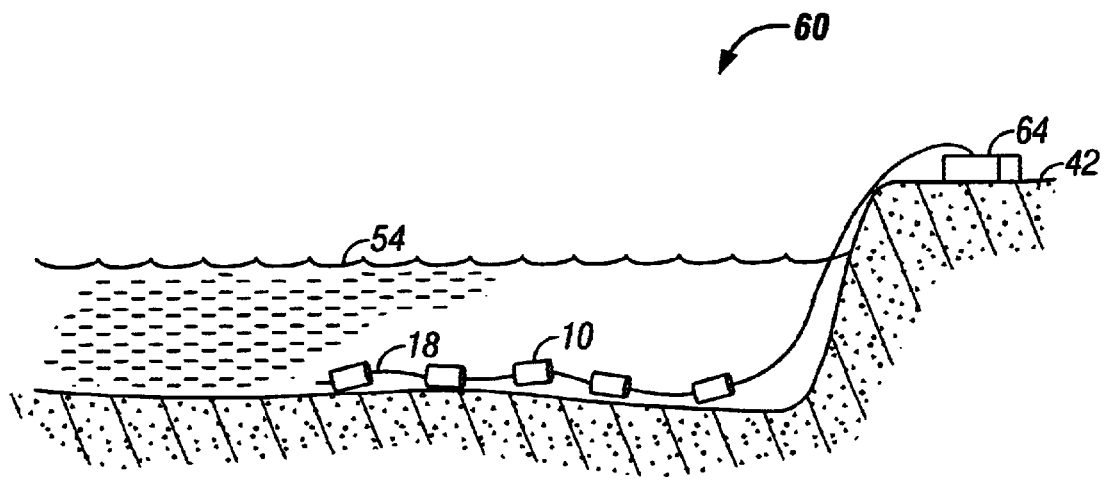
FIG. 6 is a schematic diagram showing graphite electrodes of the present disclosure positioned underwater for measuring electrical properties of ground that is underwater.

FIG. 6 shows a system 60 similar to system 50 of FIG. 5 except that system 60 is completely underwater and is stationary. In this system, there is no boat pulling a chain of electrodes 10. Rather, graphite electrodes 10 are stationary upon the bottom of the water. In FIG. 6 the instrumentation illustrated in FIG. 4 is shown as one instrument 64 for convenience. The electrical measurements that may be conducted with this system are known in the art. However, with the graphite electrodes 10, cleaning and maintenance may be avoided to yield a more cost effective, long-term monitoring station that can be left behind once measurements have been completed.

EXAMPLE 1

The inventor has tested two conventional stainless steel electrodes by using them to inject an electric current of 500 mAmp in sea water 3000 times. The electrodes showed visible signs of electrochemical degradation and corrosion. The inventor also has tested two graphite electrodes in accordance with this disclosure by using them to inject an electric current of 500 mAmp in sea water 3000 times. In contrast to the conventional electrodes, the graphite electrodes of this invention were virtually unchanged after use, showing no signs of degradation or corrosion.

Those of skill in the art should, in light of the present disclosure, appreciate that many changes may be made in the specific embodiments that are disclosed and still obtain a like or similar result without departing from the spirit and scope of the invention. For instance, although the examples herein may function with commercial resistivity meters, interface boxes, and software currently available, it will be understood by those of skill in the art that the apparatus and methods described herein may be utilized with meters, boxes, software, and other equipment that may constitute improvements to such currently-available equipment. Specifically, examples described herein may be applied to both current and future equipment such as, but not limited, to resistivity meters, interface boxes, and software.

All of the methods, systems, and apparatus disclosed and claimed herein may be made and executed without undue experimentation in light of the present disclosure. Again, while the techniques of this invention have been described in terms of specific embodiments, it will be apparent to those of skill in the art that variations may be applied to the methodology and in the steps or in the sequence of steps of the method described herein without departing from the concept, spirit and scope of the invention.

What is claimed is:

1. An electrode for measuring a property of a ground, comprising:
    a graphite body;
    a first opening extending longitudinally throughout the graphite body that receives a multi-wire cable; and
    a second opening within the graphite body that affixes one or more wires of the multi-wire cable to the graphite body.

2. The electrode of claim 1, wherein the graphite body comprises graphite having a particle size of about 5 microns.

3. The electrode of claim 2, wherein the graphite body comprises graphite having a shore hardness of about 75.

4. The electrode of claim 3, wherein the graphite body comprises graphite having an apparent density of about 1.91 grams per cubic centimeter.

5. The electrode of claim 4, wherein the graphite body comprises graphite having a flexural strength of about 14295 pounds per square inch.

6. The electrode of claim 5, wherein the graphite body comprises graphite having a resistivity of about 0.000591 ohm-inches.

7. The electrode of claim 1, wherein the second opening comprises a threaded opening for receiving a screw that affixes the one or more wires to the graphite body.

8. The electrode of claim 1, further comprising a waterproof cover upon at least a portion of the graphite body.

9. The electrode of claim 8, wherein the waterproof cover comprises polyurethane that covers opposite ends of the graphite body.

10. A method for measuring an electrical property of a ground, comprising:
    positioning a graphite electrode adjacent the ground;
    passing a multi-wire cable through a first opening extending longitudinally throughout the graphite electrode;
    affixing one or more wires of the multi-wire cable to the graphite electrode using a second opening within the graphite electrode;
    delivering a current to the ground using the graphite electrode; and
    measuring an electrical potential associated with the current.

11. The method of claim 10, wherein electrical property comprises resistivity.

12. The method of claim 10, wherein the electrical property comprises induced polarization.

13. The method of claim 10, further comprising rendering a map of the ground using the measurement of electrical potential.

14. The method of claim 10, wherein the graphite electrode comprises graphite having a particle size of about 5 microns.

15. The method of claim 10, wherein the second opening comprises a threaded opening and the affixing comprises securing the one or more wires to the graphite electrode with a screw.

16. The method of claim 10, wherein the positioning comprises placing the graphite electrode underground.

17. The method of claim 10, wherein the positioning comprises placing the graphite electrode underwater.

18. A method for long-term, maintenance-free measurement of an electrical property of a ground, comprising:
    positioning a graphite electrode underground or underwater for more than three months without removing the electrode for replacement or cleaning;
    passing a multi-wire cable through a first opening extending longitudinally throughout the graphite electrode;
    affixing one or more wires of the multi-wire cable to the graphite electrode with a screw coupled to the graphite electrode;
    delivering a current to the ground using the graphite electrode after three months of being underground or underwater and not having been replaced or cleaned; and
    measuring an electrical potential associated with the current.

19. The method of claim 18, wherein electrical property comprises resistivity.

20. The method of claim 18, wherein the graphite electrode comprises graphite having a particle size of about 5 microns.

* * * * *